US011478989B2

(12) United States Patent
Diller et al.

(10) Patent No.: US 11,478,989 B2
(45) Date of Patent: Oct. 25, 2022

(54) METHOD FOR ADDITIVELY MANUFACTURING OF THREE-DIMENSIONAL OBJECTS

(71) Applicant: CONCEPT LASER GMBH, Lichtenfels (DE)

(72) Inventors: Christian Diller, Lichtenfels (DE); Rainer Lang, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 498 days.

(21) Appl. No.: 16/151,817

(22) Filed: Oct. 4, 2018

(65) Prior Publication Data

US 2019/0143602 A1 May 16, 2019

(30) Foreign Application Priority Data

Nov. 15, 2017 (EP) ..................................... 17201943

(51) Int. Cl.
*B29C 64/371* (2017.01)
*B33Y 10/00* (2015.01)
*B28B 1/00* (2006.01)
*B29C 64/153* (2017.01)
*B33Y 30/00* (2015.01)
*B33Y 40/00* (2020.01)
*B29C 64/20* (2017.01)
*B23K 26/342* (2014.01)
*B22F 12/00* (2021.01)
*B22F 10/10* (2021.01)

(52) U.S. Cl.
CPC ............ *B29C 64/371* (2017.08); *B22F 12/00* (2021.01); *B23K 26/342* (2015.10); *B28B 1/001* (2013.01);

(Continued)

(58) Field of Classification Search
CPC ..... B29C 64/371; B29C 64/20; B29C 64/153; B33Y 10/00; B33Y 30/00; B33Y 40/00;
(Continued)

(56) References Cited

U.S. PATENT DOCUMENTS 7,547,204 B2 6/2009 Tokita et al.
10,632,567 B2 * 4/2020 Sutcliffe ................. B22F 10/20
(Continued)

FOREIGN PATENT DOCUMENTS

| JP | 2006131921 A | 5/2006 |
|----|--------------|--------|
| JP | 2015137400 A | 7/2015 |
| JP | 2017109355 A | 6/2017 |

OTHER PUBLICATIONS

Extended European Search Report Corresponding to Application No. 172019432 dated May 25, 2018.
(Continued)

*Primary Examiner* — Jacob T Minskey
*Assistant Examiner* — Caroline Beha
(74) *Attorney, Agent, or Firm* — Dority & Manning, P.A.

(57) ABSTRACT

Method for additively manufacturing three-dimensional objects, whereby flow of an inert process gas, preferably an inert gas or containing inert gas, is created, the inert process gas flowing through a chamber (3, 10) of at least one build apparatus (2) which is configured to additively manufacture three-dimensional objects by means of successive layerwise selective irradiation and consolidation of layers of a powdered build material (3) which can be consolidated by means of an energy beam, and/or through a chamber of at least one apparatus (2) which is configured to perform at least one pre-processing step of an additive manufacturing process, and/or through a chamber of at least one at least one apparatus (2) which is configured to perform at least one post-processing step of an additive manufacturing process, wherein the flow of process gas displaces a certain volume of fluid from the chamber (3, 10).

20 Claims, 2 Drawing Sheets

Figure 1:
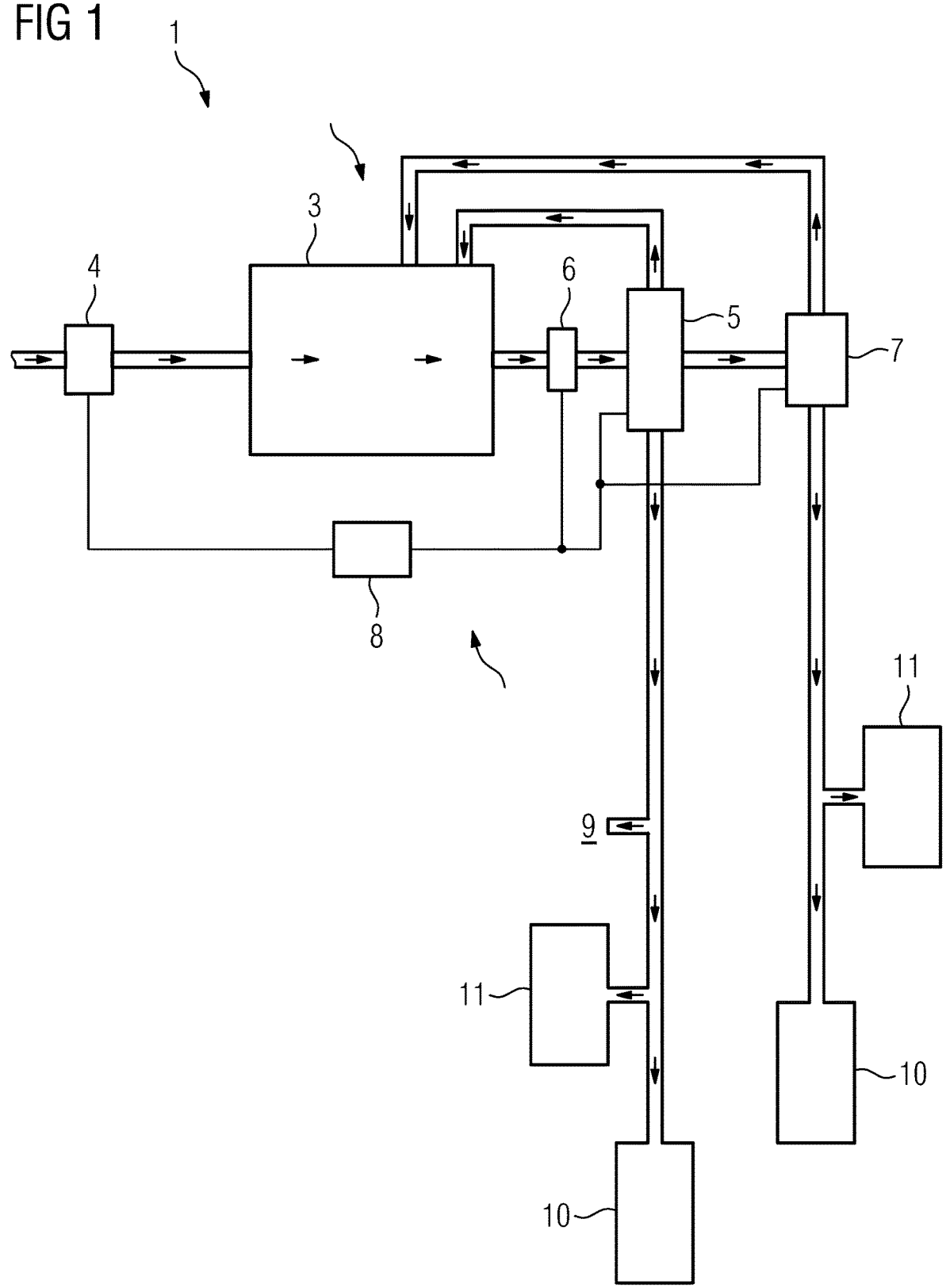

(52) U.S. Cl.
CPC ............ *B29C 64/153* (2017.08); *B29C 64/20* (2017.08); *B33Y 10/00* (2014.12); *B33Y 30/00* (2014.12); *B33Y 40/00* (2014.12); *B22F 10/10* (2021.01)

(58) Field of Classification Search
CPC . B22F 3/1055; B22F 2003/1056; B28B 1/001
See application file for complete search history.

(56) References Cited

U.S. PATENT DOCUMENTS

| | | | |
|---|---|---|---|
| 2004/0037954 A1* | 2/2004 | Heinrich ................. | C23C 24/04 427/180 |
| 2004/0216609 A1* | 11/2004 | Baksh ................. | C01B 23/0042 95/8 |
| 2006/0032441 A1* | 2/2006 | Clark ...................... | C23C 26/00 118/715 |
| 2016/0059310 A1 | 3/2016 | Junker et al. | |
| 2016/0207147 A1* | 7/2016 | Van Hassel ............. | B22F 10/70 |
| 2017/0014905 A1 | 1/2017 | Kawada et al. | |
| 2018/0117675 A1* | 5/2018 | Foret ...................... | G01N 30/88 |
| 2018/0117713 A1* | 5/2018 | Foret ...................... | G01N 30/88 |
| 2018/0126650 A1* | 5/2018 | Murphree ................. | B08B 5/04 |
| 2019/0299289 A1* | 10/2019 | Aota ....................... | B22F 3/101 |

OTHER PUBLICATIONS

Chinese Search Report Corresponding to Application No. 201710030523 dated Aug. 29, 2020.

* cited by examiner

METHOD FOR ADDITIVELY MANUFACTURING OF THREE-DIMENSIONAL OBJECTS

CROSS-REFERENCE TO RELATED APPLICATIONS

This application claims priority to European Patent Application serial no. 17 201 943.2 filed Nov. 15, 2017, the contents of which is incorporated herein by reference in its entirety as if set forth verbatim.

CROSS-REFERENCE TO RELATED APPLICATIONS

This application claims priority to European Patent Application serial no. 17 201 943.2 filed Nov. 15, 2017, the contents of which is incorporated herein by reference in its entirety as if set forth verbatim.

The invention relates to a method for additively manufacturing three—dimensional objects by means of successive layerwise selective irradiation and consolidation of layers of a powdered build material which can be consolidated by means of an energy beam, whereby a flow of inert process gas, preferably an inert gas or containing inert gas, is created, the inert process gas flowing through a chamber of at least one build apparatus which is configured to additively manufacture three-dimensional objects by means of successive layerwise selective irradiation and consolidation of layers of a powdered build material which can be consolidated by means of an energy beam and/or through a chamber of at least one apparatus which is configured to perform at least one pre-processing step for an additive manufacturing process and/or through a chamber of at least one apparatus which is configured to perform at least one post-processing step, wherein the flow of process gas displaces a certain volume of fluid from the chamber.

Such methods or manufacturing processes are known from the prior art, whereby a chamber, for example a process chamber of an apparatus used for manufacturing three-dimensional objects, or a powder chamber of a powder module or a dose module or a chamber of a handling station or the like are inerted by feeding a process gas, for example argon, into the chamber. The process gas fed into the chamber displaces fluid, normally ambient air, from the chamber. The fluid is displaced by the process gas flowing into the chamber and for example emitted via a valve.

The displacement of fluid from the chamber leads to an increasing ratio of process gas inside the chamber as the incoming process gas displaces the fluid continuously. Since the ratio of process gas contained in the fluid increases with the feeding of process gas into the chamber, not only fluid is emitted or displaced from the chamber, but also process gas contained in the fluid is emitted from the chamber as more new process gas is fed into the chamber to displace the remaining fluid.

The fluid that is displaced from the chamber is typically discharged into the environment. Thus, a specific amount of process gas is lost, as for the manufacturing processes a high ratio or degree of process gas in atmosphere of the chamber, for example more than 99% of argon, is essential. To reach such a ratio obviously nearly the whole fluid inside the chamber has to be displaced by process gas, whereby towards the end of the inertization the ratio of process gas contained in the fluid displaced from the chamber is very high, in particular above 90%. The process gas contained in the displaced fluid is therefore, wasted, as it is emitted to the environment. Therefore, for manufacturing of three-dimensional objects large volumes of process gas are used.

It is an object of the present invention to suggest a method for additively manufacturing three-dimensional objects, wherein the consumption of process gas is lowered.

The object is inventively achieved by a method for additively manufacturing three-dimensional objects according to claim 1.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

The invention is based on the idea that the fluid displaced from the chamber is at least partially collected and/or fed back into the chamber and/or fed into a chamber of at least one apparatus. Therefore, the fluid is not emitted entirely to the environment, but is at least recycled in part. The fluid displaced from the chamber is collected, for example stored in a storage unit, and/or fed back into the chamber and/or fed into a chamber of at least one apparatus. It is therefore possible to collect the fluid that is normally emitted to the environment and therefore, lost. The collected fluid can be recycled, for example used in the chamber or in the chamber of another apparatus. Thus, the consumption of process gas can be reduced, as a specific amount of process gas can be reused instead of being discharged into the environment. In particular, towards the end of inertization processes the ratio of process gas in the fluid displaced from the chamber is very high, so that the fluid can instantly be reused for processes with lower requirements regarding the ratio of process gas without further treatment.

It is particularly preferred that the part of fluid displaced from the chamber is collected and/or fed to a chamber and/or fed back into the chamber dependent on a ratio of process gas contained in the fluid. Therefore, the ratio of process gas contained in the displaced fluid is determined, for example by an adequate measurement device. Dependent on the ratio of process gas contained in the fluid displaced from the chamber it can be decided, whether the fluid can be reused or used for another process or processing step. In the manufacturing of three-dimensional objects there are some processing steps with lower requirements regarding the inertization of the chamber, for example post-processing steps such as the handling inside the handling station, in particular the cleaning of the manufactured object or filtering or sieving of the building material.

While a chamber is made inert, the ratio of process gas contained in the fluid displaced from the chamber is increasing continuously as more fresh process gas flows into the chamber and displaces unwanted components inside atmosphere of the chamber. Via the determination of the ratio of process gas contained in the fluid it is possible, to decide starting from which ratio of process gas the fluid is collected and/or fed into a chamber of at least one apparatus and/or fed back into the chamber the fluid has been displaced from.

According to an alternative, it is possible to store the fluid displaced from the chamber in at least one storage unit. The displaced fluid can afterwards be used for another or a succeeding processing step. Thereby, it can be decided whether to store the fluid or it can be decided in which storage unit the fluid is stored. It is possible, to store the fluid in different storage units as the ratio of process gas contained in the displaced fluid increases while the chamber is made inert.

According to a preferred embodiment of the present invention, a minimum ratio of process gas is defined for at least two processing steps, wherein the fluid is collected, if the defined minimum ratio is reached or exceeded with respect to the corresponding processing step. The inventive method according to the preferred embodiment therefore, distinguishes between at least two processing steps. The various processing steps differ from another, for example regarding a purification or inertization requirement. For example, some post-processing steps have low inertization requirements, such as a ratio of process gas of about 90%, the fluid can be collected earlier and used for the specific processing step. Other processing steps can have stronger requirements regarding the inertization and can for example require the fluid to have a higher ratio of process gas, of above 99%, for instance. Therefore, the collected fluid can be used for different processing steps dependent on the ratio of process gas contained in the fluid.

Another embodiment of the present invention preferably suggests that the collected fluid is purified to a defined degree, preferably greater than 90% process gas, more preferably more than 95% process gas, in particular more than 99.9% process gas. According to this embodiment the fluid can be collected after it has been displaced from the chamber and can be purified, for example using a purification unit. The purification unit increases the ratio of process gas in the fluid as it separates unwanted components from the process gas. By way of the purification process the fluid displaced from the chamber can be completely collected, whereby the process gas contained in the fluid can be separated and reused.

In particular, fluid content diverging from the process gas is removed or reduced by purifying the fluid, whereby the degree of purification is defined dependent on a ratio of process gas necessary for at least one processing step. The degree of purification can therefore, be defined regarding at least one processing step the fluid shall be used for. Therefore, the fluid displaced from the chamber can be collected and purified with regard to a succeeding processing step and the accompanying requirements. Preferably, it is also possible, that the collected fluid is stored for at least one succeeding processing step. It is therefore, not necessary to use the fluid instantaneously as it is collected or purified, but the fluid can be stored, in particular dependent on the ratio of process gas, and can be used for a at least one succeeding processing step.

Besides, the invention relates to a plant for additively manufacturing three-dimensional objects by means of successive layerwise selective irradiation and consolidation of layers of a powdered build material which can be consolidated by means of an energy beam, comprising at least one build apparatus for at least one manufacturing step and/or at least one apparatus which is configured to perform at least one pre-processing step for an additive manufacturing process and/or at least one apparatus which is configured to perform at least one post-processing step, whereby the plant comprises a flow device configured to create a flow of inert process gas, preferably an inert gas or containing an inert gas, into a chamber of at least one apparatus displacing a certain volume of fluid from the chamber, whereby a collecting unit is configured to at least partially collect the fluid displaced from the chamber and/or feed back into the chamber or feed into a chamber of at least one apparatus.

Of course, all details, features and advantages described with respect to the inventive method are transferable to the inventive plant. The at least one apparatus of the inventive plant is therefore preferably configured to execute the inventive method.

According to a preferred embodiment of the inventive plant a measuring unit is configured to measure the ratio of process gas contained in the fluid displaced from the chamber. Therefore the ratio of process gas that is emitted or displaced from the chamber, respectively, can be determined, whereby preferably a decision can be made, whether to collect the displaced fluid and/or feed the displaced fluid into the or a chamber.

Depending on the determined ratio of process gas it also can be decided, whether the fluid has to be purified, whereby the inventive plant or at least one apparatus preferably comprises a purification unit configured to increase the ratio of process gas contained in the fluid displaced from the chamber of at least one apparatus. Therefore, the fluid displaced from the chamber can be collected, in particular stored, or reused, in particular fed back into the chamber or fit into a chamber of an apparatus, or purified dependent on the content of process gas.

Of course, it is also possible to purify the collected fluid and feed the fluid back into the chamber or feed the fluid into a chamber of an apparatus subsequently. Self-evidently, all technically reasonable combinations of collecting and/or purifying and/or storing and/or feeding of the fluid are possible, in particular with respect to at least one of processing step and the accompanying requirements and/or the ratio of process gas in the fluid.

The inventive plant preferably comprises a control unit configured to control the feedback of fluid into the chamber and/or the feeding of fluid into a chamber of at least one apparatus and/or the storage of the fluid in at least one storage unit dependent on a ratio of process gas contained the fluid. Therefore, the control unit is configured to receive specific parameters, such as the ratio of process gas in the fluid. The control unit therefore controls the relevant valves, flow devices and the like to assure the flow of fluid into the various chambers and/or at least one storage unit and/or at least one purification unit.

Further, the inventive plant preferably comprises at least two storage units, configured to receive the collected fluid. The fluid is stored in one of the various storage units dependent on the ratio of process gas contained in the fluid. According to this embodiment a various number of storage units can be provided, whereby preferably each storage unit or each group of storage units corresponds to a processing step, particularly defined by an inertization requirement.

Therefore, the fluid can be stored in one of the various storage units, whereby the fluid is stored dependent on the actual ratio of process gas. As the ratio of process gas in the fluid is increasing while the chamber is inerted it can be determined in real time in which of the storage units the fluid is stored and/or whether a purification process is necessary or reasonable.

Figure 2:
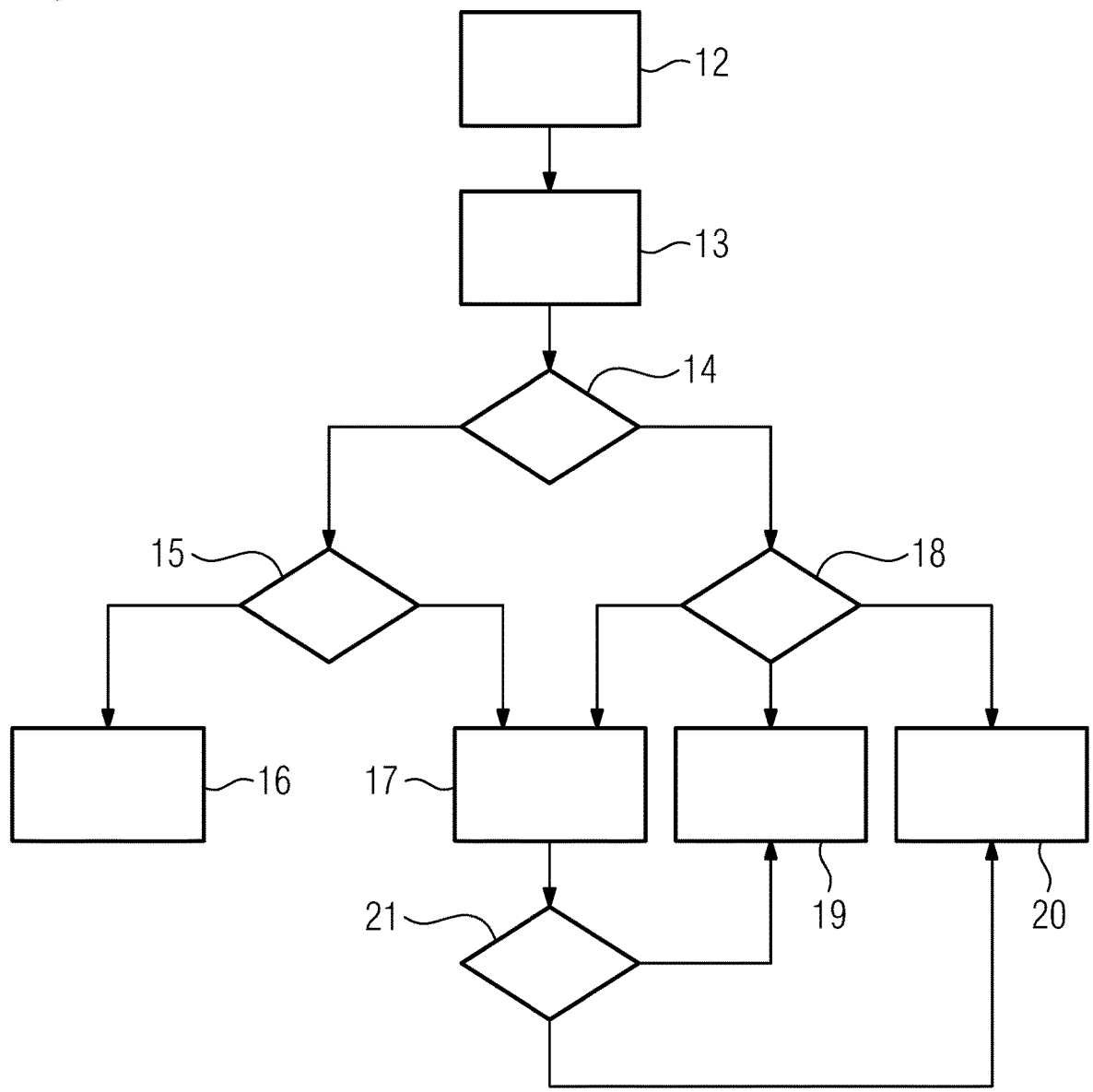

Exemplary embodiments of the invention are described with reference to the Fig., whereby FIG. 1 shows an inventive plant according to an embodiment; and FIG. 2 shows a flow diagram of an inventive method according to an embodiment.

FIG. 1 shows a plant 1 comprising an apparatus 2 for additively manufacturing three-dimensional objects by means of successive layerwise selective irradiation and consolidation of layers of a powdered build material which can be consolidated by means of an energy beam. The plant 1 comprises an apparatus 2 for manufacturing three-dimensional objects, which comprises a chamber 3, in particular a process chamber, a flow device 4, a valve 5, a measuring unit 6 and a purification unit 7. The flowing direction of a flow of process gas, e.g. generated by the flow device 4, is indicated via arrows. The flow device 4, the valve 5, the measuring unit 6 and the purification unit 7 are controlled by a central control unit 8. The valve 5, the measuring unit 6, the purification unit 7 and the central control unit 8 can be considered part of a collecting unit 22.

The flow device 4 is linked to a process gas supply [not shown], whereby the control unit 8 is configured to control the flow device 4 in such a way that a flow of process gas into the chamber 3 can be regulated. As process gas is supplied to the chamber 3 a fluid inside the chamber 3 is displaced by the process gas flowing into the chamber 3. The fluid displaced from the chamber 3 flows through a pipe, whereby the measuring unit 6 determines a ratio of process gas contained in the fluid. Of course, it is also possible to have the measuring unit 6 inside the chamber 3 to determine the current ratio of process gas inside the chamber 3. The measuring unit 6 is configured to send the determined ratio of process gas to the control unit 8.

Based on the received ratio of process gas of the fluid that is currently flowing through the measuring unit 6 the control unit 8 can regulate and/or direct the fluid flow through the valve 5, whereby the fluid is directed dependent on the ratio of process gas in the fluid. If the ratio of process gas is very low, for example below 10%, a further processing of the fluid may not be reasonable or efficient. Therefore, the fluid is not collected and discharged to the environment 9. Further, it is possible to feed the process gas to another chamber 10 of another apparatus, dependent on the inertization requirement of the processing step the corresponding apparatus is used for. For example, post-processing steps normally have lower inertization requirements, so the fluid could be used without further treatment.

Additionally, the fluid can be directed to the purification unit 7, whereby the purification unit 7 is configured to increase the ratio of process gas contained in the fluid displaced from the chamber 3 of the apparatus 2. It is also possible, if the ratio of process gas is high enough, for example towards the end of an inertization process of the chamber 3, to feed the fluid back into the chamber 3.

Alternatively, the control unit 8 controls the purification unit 7 with respect to the inertization requirement in the chamber 3 or with respect to a inertization requirement of another processing step. The purification unit 7 can be used for purifying the fluid displaced from the chamber 3, whereby, if a defined degree of purification, for example 99.9%, is reached or exceeded the fluid can be fed back into the chamber 3. Of course, it is also possible to feed the fluid into at least one chamber 10 of another apparatus. The other apparatus can for example be a powder module or a dose module or a handling station. The other apparatus is in particular used for at least one pre-processing step or at least one post-processing step. Self-evidently arbitrary combinations of apparatuses for pre-processing, post-processing or manufacturing can be made.

Further, the plant 1 comprises at least one storage unit 11, whereby the fluid displaced from the chamber 3 can be stored in one of the storage units 11 dependent on the ratio of process gas contained in the fluid. Therefore, the control unit 8 controls the valve 5 and/or the purification unit 7 so that the fluid can be directed to the corresponding storage unit 11. The plant 1 may comprise multiple storage units 11 (not shown), wherein different storage units 11 may contain fluid with different process gas ratios. Therefore, the fluid can be stored for succeeding processing steps and re-used in the apparatus 2 or another apparatus.

In particular, nearly the entire process gas fed into the chamber 3 can be reused, as the fluid displaced from the chamber 3 can be collected and purified via the purification unit 7, whereby it can be assured, that only the process gas, for example argon, is fed back into the chamber 3. Thereby, the ratio of process gas inside the chamber 3 increases and only the contents of the fluid inside the chamber 3 that deviate from the process gas are separated and emitted to the environment 9. By way of the invention it is therefore possible, to reuse or recycle the process gas and therefore lower the consumption of process gas.

FIG. 2 shows a flow diagram of an inventive method for additively manufacturing three-dimensional objects by successively and selectively exposing layers of building material in powder form with an energy beam in conjunction with successive and selective solidification of the exposed parts of the layers of building material. The inventive method shall be explained with the aid of the plant 1 depicted in FIG. 1, whereby the same reference numerals are used.

The inventive method starts in step 12, whereby an inertization of the chamber 3 of the apparatus of the plant 1 is started. To start the inertization process of the chamber 3 the control unit 8 is regulating the flow device 4 so that process gas can flow into the chamber 3. In step 13 the ratio of process gas in the fluid displaced from the chamber 3 is determined by the measuring unit 6. The ratio of process gas is subsequently transmitted to the control unit 8.

In step 14 the control unit 8 decides, whether the ratio of process gas in the fluid is high or low, whereby an arbitrary threshold value can be predefined in the control unit 8. If the ratio of process gas is low or below the threshold value the method continues in step 15. Dependent on the ratio of process gas the fluid is led to the purification unit 7 or directed into the environment 9. Again, a corresponding threshold value defining, whether a purification of the fluid is reasonable or whether the fluid should be emitted to the environment 9 can be predefined in the control unit 8. If the ratio of process gas is below the predefined threshold value the fluid is emitted to the environment in step 16. If a purification of the fluid is reasonable the fluid is directed to the purification unit 7, where the fluid can be purified.

If the determination in step 14 results in a higher ratio of process gas in the fluid or the ratio is above the predefined threshold value, the method continues in step 18. There, again, threshold values or threshold intervals can be defined, so that the further processing of the fluid can be set.

Dependent on the ratio of process gas, the fluid can be fed back into the chamber 3, 10 via step 19 or stored in a storage unit 11 via step 20. If the ratio of process gas is lower, the method continues in step 17, whereby the fluid is directed to the purification unit 7. Dependent on the degree of purification the control unit 8 decides in step 21 whether to feed the process gas into the chamber 3, 10 via step 19 or store it in one of the various storage units 11 via step 20.

Self-evidently, all technically reasonable combinations of collecting and/or purifying and/or storing and/or feeding of the fluid are possible, in particular with respect to at least one of processing step and the accompanying requirements and/or the ratio of process gas in the fluid.

The invention claimed is:

1. A method for additively manufacturing three-dimensional objects by means of successive layerwise selective irradiation and consolidation of layers of a build material, the method comprising:
   flowing an inert process gas through a first chamber to at least partially displace a volume of fluid from the first chamber as a displaced fluid, wherein the first chamber is configured for an additive manufacturing step, a pre-processing step and/or a post-manufacturing step for the three-dimensional objects;
   determining a ratio of the inert process gas contained in the displaced fluid; and,
   based on the ratio, feeding back at least a portion of the displaced fluid and/or collecting the at least the portion of the displaced fluid for feeding back the at least the portion of the displaced fluid if the ratio exceeds a threshold, and purifying the at least the portion of the displaced fluid via a purification unit if the ratio is below the threshold to increase the ratio of the inert process gas contained in the displaced fluid prior to feeding back the at least the portion of the displaced fluid and/or collecting the at least the portion of the displaced fluid for feeding back the at least a portion of the displaced fluid;
   wherein the feeding back the at least the portion of the displaced fluid comprises feeding back the at least the portion of the displaced fluid into the first chamber, and
   wherein the feeding back the at least the portion of the displaced fluid comprises feeding back the at least the portion of the displaced fluid into a second chamber configured for an additive manufacturing step, a pre-processing step and/or a post-manufacturing step for the three-dimensional objects.

2. The method of claim 1, wherein the threshold is an additive manufacturing step threshold, a pre-processing step threshold and/or a post-manufacturing step threshold for the first chamber.

3. The method of claim 1, wherein if the ratio exceeds a threshold, the at least the portion of the displaced fluid is collected in a storage unit for use during a subsequent additive manufacturing step, pre-processing step and/or post-manufacturing step for the three-dimensional objects.

4. The method of claim 1, wherein if the ratio exceeds a threshold, the at least the portion of the displaced fluid is fed back for use during a subsequent additive manufacturing step, pre-processing step and/or post-manufacturing step for the three-dimensional objects.

5. The method of claim 1, wherein the purifying of the at least the portion of the displaced fluid comprises purifying until the ratio comprises at least 90% of the inert process gas.

6. The method of claim 1, wherein the build material is a metal, a ceramic, or a polymer powder.

7. The method of claim 1, wherein the selective irradiation is via an energy beam.

8. The method of claim 7, wherein the energy beam is a laser beam or an electronic beam.

9. The method of claim 1, wherein the inert process gas comprises argon, nitrogen, or carbon dioxide.

10. The method of claim 1, wherein the determining the ratio of the inert process gas contained in the displaced fluid is via a measuring device.

11. The method of claim 1, wherein the post-manufacturing step for the three-dimensional objects comprises cleaning the three-dimensional objects, filtering the build material, or sieving the build material.

12. The method of claim 1, wherein a control unit is configured to control the feeding back.

13. The method of claim 1, wherein a control unit is configured to control valves for controlling the feeding back via the valves.

14. The method of claim 1, wherein a control unit is configured to control valves for controlling the feeding back to the first chamber, to the second chamber, to the purification unit, and to a storage unit for the collecting of the at least the portion of the displaced fluid.

15. The method of claim 10, wherein the measuring device transmits the ratio of the inert process gas contained in the displaced fluid to a control unit.

16. The method of claim 1, wherein the threshold is an additive manufacturing step threshold, a pre-processing step threshold and/or a post-manufacturing step threshold for the second chamber.

17. The method of claim 1, wherein the threshold is an additive manufacturing step threshold, a pre-processing step threshold and/or a post-manufacturing step threshold for the second chamber.

18. The method of claim 1, wherein the purifying of the at least the portion of the displaced fluid comprises purifying until the ratio comprises at least 99% of the inert process gas.

19. The method of claim 3, wherein the storage unit is a plurality of storage units.

20. The method of claim 1, wherein a control unit is configured to control the flowing of the inert process gas via a flow device.

* * * * *